(12) United States Patent
Sherman et al.

(10) Patent No.: US 11,462,947 B2
(45) Date of Patent: *Oct. 4, 2022

(54) WIRELESS POWER RECEIVER HAVING TRANSFER OPTIMIZATION AND METHOD THEREOF

(71) Applicant: POWERMAT TECHNOLOGIES LTD., Petach Tikva (IL)

(72) Inventors: Itay Sherman, Petach Tikva (IL); Elieser Mach, Rosh Tzurim (IL); Amir Salhuv, Nes Ziona (IL)

(73) Assignee: POWERMAT TECHNOLOGIES LTD., Petach Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,256

(22) Filed: Nov. 5, 2021

(65) Prior Publication Data

US 2022/0060054 A1    Feb. 24, 2022

Related U.S. Application Data

(63) Continuation of application No. 16/753,227, filed as application No. PCT/IL2018/051080 on Oct. 3, 2018, now Pat. No. 11,190,052.

(Continued)

(51) Int. Cl.
*H02J 5/00* (2016.01)
*H02J 50/12* (2016.01)
(Continued)

(52) U.S. Cl.
CPC ............ *H02J 50/12* (2016.02); *H02J 50/005* (2020.01); *H02J 50/80* (2016.02); *H02M 1/14* (2013.01);
(Continued)

(58) Field of Classification Search
CPC . H02J 5/005; H02J 7/025; H02J 17/00; H01F 38/14; B60L 11/182
(Continued)

(56) References Cited

U.S. PATENT DOCUMENTS 10,811,987 B2    10/2020 Parsekar et al.
2010/0277003 A1    11/2010 Von Novak, III et al.
(Continued)

FOREIGN PATENT DOCUMENTS

WO    2016/137637 A2    9/2016

OTHER PUBLICATIONS

International Preliminary Report issued in International Application No. PCT/IL2018/051080, dated Apr. 16, 2020, 6 pages.
(Continued)

*Primary Examiner* — Quan Tra
(74) *Attorney, Agent, or Firm* — Volpe Koenig (57) ABSTRACT

According to one aspect of the present disclosed subject matter, a receiver inductively powered by a transmitter for powering a load, the receiver comprising: a resonance circuit capable of tuning its resonance frequency for coupling with the transmitter and generate AC voltage; a power supply section configured to rectify the AC voltage and adjust a DC current and a DC voltage to the load; and a control and communication section designed to set parameters for the receiver and communicate operation points (OP) to the transmitter, wherein the parameters and the OP derived from determining a minimal power loss of the receiver.

20 Claims, 3 Drawing Sheets

Related U.S. Application Data (60) Provisional application No. 62/648,406, filed on Mar. 27, 2018, provisional application No. 62/567,364, filed on Oct. 3, 2017.

(51) Int. Cl.
| | | |
|---|---|---|
| *H02J 50/80* | (2016.01) | |
| *H02M 1/14* | (2006.01) | |
| *H02M 3/158* | (2006.01) | |
| *H04B 5/00* | (2006.01) | |
| *H02J 50/00* | (2016.01) | |
| *H02J 7/00* | (2006.01) | |
| *H02M 1/00* | (2006.01) | |

(52) U.S. Cl.
CPC .......... *H02M 3/158* (2013.01); *H04B 5/0037* (2013.01); *H04B 5/0075* (2013.01); *H02J 7/00034* (2020.01); *H02M 1/0048* (2021.05)

(58) Field of Classification Search
USPC .......................................... 327/104; 307/104
See application file for complete search history.

(56) References Cited

U.S. PATENT DOCUMENTS

| | | |
|---|---|---|
| 2011/0266880 A1 | 11/2011 | Kim et al. |
| 2011/0273152 A1 | 11/2011 | Weir |
| 2012/0223590 A1 | 9/2012 | Low et al. |
| 2013/0278209 A1 | 10/2013 | Von Novak, III et al. |
| 2014/0104896 A1 | 4/2014 | Tallam |
| 2015/0340877 A1 | 11/2015 | Lin et al. |
| 2015/0340881 A1 | 11/2015 | Nakano et al. |
| 2015/0341087 A1 | 11/2015 | Moore et al. |
| 2016/0196906 A1 | 7/2016 | Kim et al. |
| 2016/0196913 A1 | 7/2016 | Kim et al. |
| 2016/0204713 A1 | 7/2016 | Dwari |
| 2016/0285280 A1 | 9/2016 | Kallal et al. |
| 2018/0337600 A1* | 11/2018 | Neumayr ................ H02M 1/32 |

OTHER PUBLICATIONS

International Search report and Written Opinion issued in International Application No. PCTI/L2018/051080, dated Jan. 21, 2019, 12 pages.

Supplementary European Search Report issued in European Application No. 18864877.8, dated Apr. 13, 2021, 3 pages.

Anonymous, "ACDC voltage doubler rectifier," Electrical Engineering Stack Exchange, Nov. 25, 2014 XP055590131 (Nov. 25, 2014).

Wang, Mingliang, "Integrated power inductors in silicon for compact DCDC converters in portable electronics," Dissertation, Jan. 1, 2010 University of Florida, pp. 1-136, XP055590131, (Jan. 1, 2010).

* cited by examiner

WIRELESS POWER RECEIVER HAVING TRANSFER OPTIMIZATION AND METHOD THEREOF

CROSS REFERENCE TO RELATED APPLICATIONS

This application is a continuation of U.S. patent application Ser. No. 16/753,227, filed Apr. 2, 2020, which is the 371 National Phase Application of PCT/IL2018/051080, filed Oct. 3, 2018, which claims the benefit of U.S. Provisional Application No. 62/648,406, filed Mar. 27, 2018 and U.S. Provisional Application No. 62/567,364, filed Oct. 3, 2017, which is/are incorporated by reference as if fully set forth.

TECHNICAL FIELD

The present disclosed subject matter relates to wireless power charging systems. More particularly, the present disclosed subject matter relates to minimizing power loos in wireless power transfer.

BACKGROUND

Growing demand for wireless power charging systems led to dramatic deployments increase, in a wide variety of venues, and raises the need for increasing the effective charging distance between a transmitter and a receiver. Inductive wireless power systems still suffer from poor power transfer efficiency, losses in these systems.

Wireless power charging is becoming a common feature in mobile devices. Most devices are currently limited to 5 W of wireless charging power, but there is strong demand for increasing the power levels transferred to match capabilities of wired chargers that are reaching 15 W or more. The ability to achieve these levels of power is limited due to power losses on the receivers.

The most problematic power loss is on embedded receivers such as the ones embedded in mobile handsets. Losses in embedded receivers cause significant increase of device temperature. Specifically, in the case of wireless charging, the losses of the wireless power transfer (e.g. air gap transformer) are applied simultaneously with charging of the embedded battery, which produces additional heat.

These commercially available receivers utilize coils and ferrites that produce relatively high AC resistance (e.g. up to 0.5 ohm) due to form factor constraints of such receivers.

Power may also be wasted on resistances such as capacitors equivalent series resistance (ESR). It is also noted that measured AC resistance often increases when measuring the coil parameters within the embedding device since in many cases the embedding device has significant metal behind the coil. Due to the very thin ferrite shield, often the metal of the embedding device is not shielded properly and reflects as AC resistance on the receiver coil.

BRIEF SUMMARY

According to one aspect of the present disclosed subject matter, a receiver inductively powered by a transmitter for powering a load, the receiver comprising: a resonance circuit capable of tuning its resonance frequency for coupling with the transmitter and generate AC voltage; a power supply section configured to rectify the AC voltage and adjust a DC current and a DC voltage to the load; and a control and communication section designed to set parameters for the receiver and communicate operation points (OP) to the transmitter, wherein the parameters and the OP derived from determining a minimal power loss of the receiver.

In some exemplary embodiments, the power supply section comprising a rectifier and a DC2DC.

In some exemplary embodiments, the resonance circuit comprising a coil and an equivalent capacitor, wherein the equivalent capacitor comprising at least one parallel capacitor and an optional one or more resonance capacitor, and wherein a value of the equivalent capacitor is a parallel resultant value of the parallel capacitor and the optional one or more resonance capacitor.

In some exemplary embodiments, each optional resonance capacitor of the optional one or more resonance capacitor can be engaged to the resonance circuit with a toggle switch activated by the controller.

According to another aspect of the present disclosed subject matter, an inductors sub-assembly (sandwich) comprising: the coil, wherein the coil is printed on a flexible printed circuit (FPC); an inductor of the DC2DC, wherein the inductor is printed on a FPC; and a first ferrite layer embedded between the coil and the inductor, wherein the coil is affixed to one side of the first ferrite layer and an opposite side of the first ferrite layer is a affixed to one side of the inductor.

In some exemplary embodiments, the sandwich further comprises a second ferrite layer affixed to an opposite side of the inductor.

According to yet another aspect of the present disclosed subject matter, a method for minimizing power loss of the receiver, the method comprising: determining an operation point of the transmitter that produce required input voltage to the DC2DC; establishing switching frequency that yield predetermined ripple requirement; determining required output power of the receiver and a needed AC current for obtaining the output current; calculating power losses for all input voltage in range of the receiver and determining a minimal power loss; and configuring the receiver and the transmitter with operation point and parameters that yield the minimal power loss.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

One objective of the present disclosure is to optimize the power transfer of a wireless power transfer system by minimizing the power losses on the system's receiver.

One technical problem dealt with by the disclosed subject matter is power loss in wireless power transfer, resulting from ohmic losses on the receiver circuitry. The ohmic losses comprise parasitic resistance of coils; capacitors; rectifying circuitry; output power regulators; and any combination thereof, or the like.

Another technical problem dealt with by the disclosed subject matter is minimizing power loss, in wireless power transfer, resulting from protection ferrite of receivers that are embedded in handheld devices, such as smartphones; tablets; notebooks computers; and any combination thereof, or the like Yet another technical problem dealt with by the disclosed subject matter is power loss, in wireless power transfer, resulting from metal objects of the handheld devices that the receiver is emended to.

One technical solution is dealing with losses of the receiver circuitry. Since ohmic losses are mostly dependent on the current flowing in the receiver circuit. In some exemplary embodiments, minimizing the power loss on the receiver may be done adjusting the voltage-current ratio to reduce ohmic losses while maintaining same transferred power level. It should be noted that, these adjustments (to be described in detail further below) supersede and or complement the use of special components with low ohmic losses for enhancing the efficiency of the system.

Another technical solution is dealing with the magnetic field strength that is impacted by specific elements such as metal objects and the protection ferrite. Since the magnetic field on the receiver is a superposition of a magnetic field created by at least one transmitting coil, and the magnetic field created by the receiver coil. Then, the field strength may be as high as the sum of the two fields strength or as low as the difference between them, depending on the phase between them. In some exemplary embodiments of the disclosed subject matter, the system is configured to regulate its operation to points were the overall losses are minimal.

Figure 1:
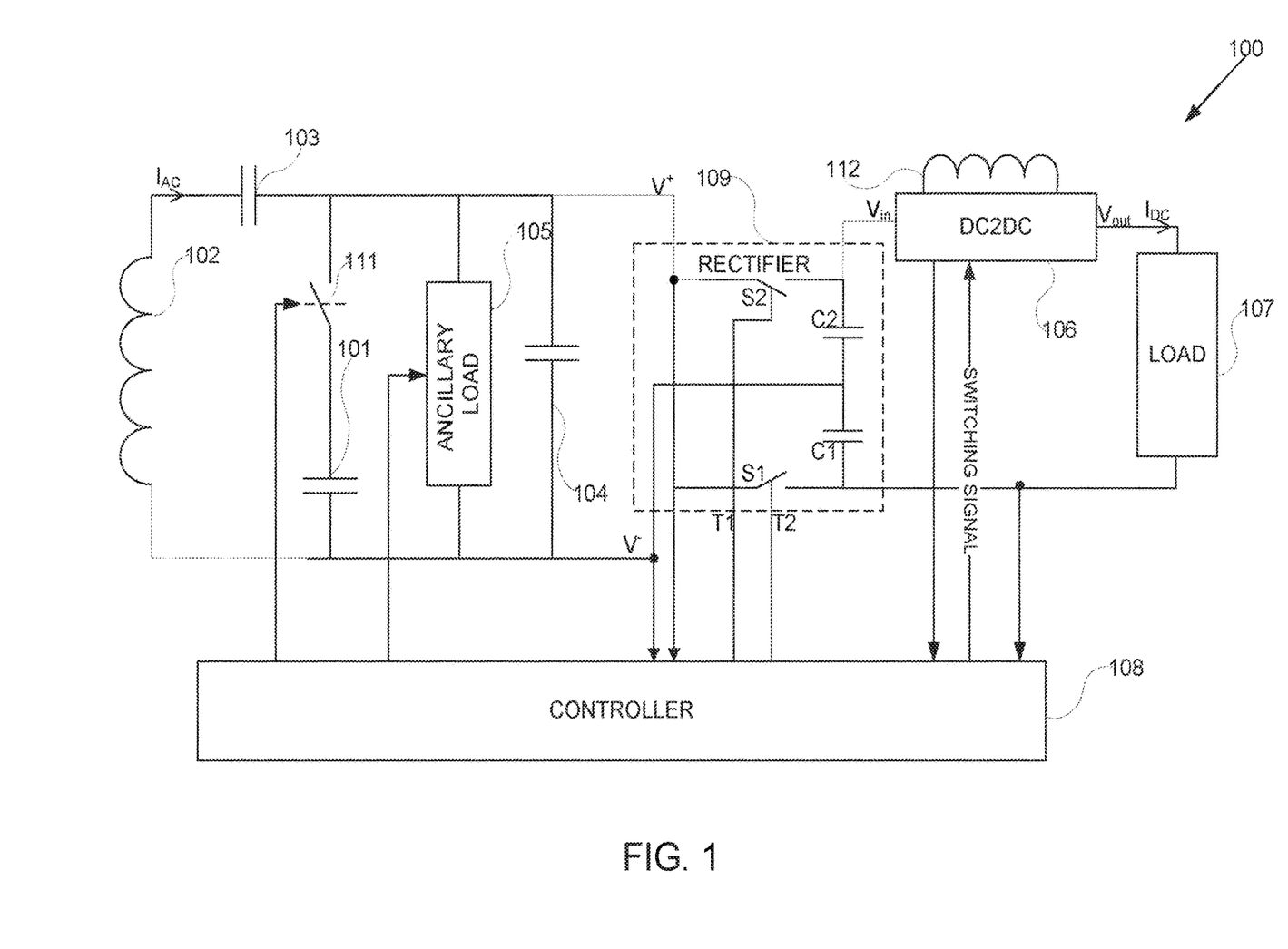
FIG. 1 shows a block diagram of a receiver, in accordance with some exemplary embodiments of the disclosed subject matter.

Referring now to FIG. 1 showing a block diagram of a receiver circuitry 100, in accordance with some exemplary embodiments of the disclosed subject matter. The receiver circuitry (Rx) 100 may be used to wirelessly obtain induced power from a transmitter (not shown) for supplying power to a load 107. For example, the Rx may be used for charging handheld battery, a power supply, a combination thereof, or the like. Additionally, the Rx 100 may be capable of wirelessly communicate with the transmitter (Tx).

In some exemplary embodiments, the Rx 100 may be comprised of: a resonance coil 102; a parallel resonance capacitor (cap) 104; a serial resonance capacitor (cap) 103; an ancillary load 105; a DC-to-DC convertor (DC2DC) 106; a controller 108 and a rectifier 109. It will be noted that, Rx 100 may be based on the following three sections:

a. A coil 102 covered with ferrite, a cap 103 and a cap 104, which constitute a resonate section (circuit) of Rx 100.

b. Rectifier 109 and the DC2DC 106, which constitute a power-supply section of the Rx 100.

c. Controller 108 and ancillary load 105, which constitute a control and communication section of the Rx 100.

The values of the resonance circuit components are defined to match with a Tx transmitted frequency. The Rx 100 of the present disclosure may be provided with or without cap 104. Additionally, or alternatively, the resonance circuit may further comprise at least one branch each having a tuning capacitor (rcap) 101 and a switch 111 controlled by controller 108. In some exemplary embodiments, controller 108 may toggle switch 111, of the at least one branch, to engage the branch rcap 101 as an additional parallel capacitor that can alter the resonance frequency of the resonance circuit, thus changing the operational point of the system. In some exemplary embodiments, the coil 102 may be incorporated within a sandwich having at least one layer of ferrite (to be described in detail further below).

The rectifier 109 of the power supply section may be utilized for converting AC voltage attained by the resonance circuit to DC voltage. Rectifier 109 may be based on commercially available Half-wave rectification; full-wave rectification; controlled (FET-based) full-wave rectification; and any combination thereof, or the like. In contrast to the commercially available rectification topology, rectifier 109 of the present disclosure may be implemented using two capacitors (C1, C2) and only two switches (S1, S2) that are controlled by either a dedicated logic circuit or controller 108 as depicted in FIG. 1. In some exemplary embodiments, S1 and S2 may be implemented by NMOS-FET; PMOS-FET; and a combination thereof, wherein each FET is separately gated by the controller, while C1 and C2 serve as charge holding capacitors.

In some exemplary embodiments, gates of S1 and S2, i.e. gates of Field-effect transistor (FET), may be toggled in such way that one FET is open during one half of the AC cycle, generated by the resonance circuit, and the other is open on the second half. Thereby charging C1 to V− and C2 to V+. Thus, the output voltage of the present disclosure rectifier 109 shall be 2*|V|. In some exemplary embodiments, control signals T1 and T2 may be inverted relative to one another with minimal dead time insertion on the transition to prevent both FETs from being open at the same time. The active duration time of T1 and T2 shall be dictated by controller 108 as follows T1 may be active when V+>V− and T2 may be active when V−>V+, it should be noted that, controller 108 may be capable of making the determination based on sensing V+ and V−.

One technical effect of utilizing the rectification topology (described above) of the present disclosure, i.e. using only two FETs vs 4 FETs, is reducing power loss on the FETs since the current flows only through a single FET (not 2) at each half of the cycle. Another technical effect of utilizing the disclosed rectification topology is boosting the input voltage to the DC2DC 106 by a factor of two compare to commercially available topology. This advantage may be effective in cases where the coupling factor of the receiver the transmitter is poor. Such as for example, when the receiver is placed with large vertical or horizontal offset.

Additionally, or alternatively, rectifier 109 may further comprise a commercially available rectifier, based on either 4 FET or 2FET+2Diode topology. In such embodiment, the controller may be capable of selecting between the two FETs (present disclosure) and the commercially available topologies. In yet another exemplary embodiment, the controller 108 may be able to configure a 4 FET topology to operate as a two FET topology. It should be noted that, that such combination of topologies may become useful to provide best efficiency for the specific operation conditions.

In some exemplary embodiments, the DC2DC 108, of the power supply section, may be utilized for adjusting output voltage and/or current, attained from rectifier 109, to load 107. In some exemplary embodiments, DC2DC 108 may be a DC-to-DC converter capable of stepping up its output voltage magnitude, above its input voltage, and/or stepping down its output voltage to almost zero. To do so the DC2DC utilizes inductor 112 used for both the stepdown mode and step-up mode. The DC2DC 108 can be based on the principles of a switched mode power supply having its output voltage vary, across a relatively large range. The output voltage of the DC2DC 106 can be regulated by varying frequency and duty-cycle of the DC2DC 106 switching, such as a switch mode power-supply, with a switching signal generated at controller 108.

DC2DC 106 requires inductor 112 that have sufficient inductance for sustaining the current levels required by load 107, however low DC resistance (DCR) in order to avoid power loss. It should be noted that, the amount of inductance required is inversely proportional to the switching frequency, and linearly to amount of current ripple allowed. The current ripple on the inductor follows the AC resistance (ACR) of the inductor and thus needs to be taken in consideration. In view of the above it will be understood that, high switching frequency increases losses on the FETs of the DC2DC 106 and thus, a large inductance in coupling having high currents requires larger and thick inductor 112. This requirement poses a challenge due to the limited form factor (especially thickness) of handheld devices. To overcome this challenge the present disclosure provides a solution that allows for integration of such inductor 112 the inductors sub-assembly (sandwich) (to be described in detail further below).

As mentioned above the switching frequency of the DC2DC effects the DC2DC 106 efficiency. On the one hand, higher switching frequency increases losses on FETs of the DC2DC, on the other hand, lower frequency would produce higher ripple on DC2DC 106 current, subsequently increasing power losses due to higher Peak to Average ratio of the current signal as well as degrading the inductor 112 ACR.

In some exemplary embodiments, controller 108 may be configured to determine these losses based on known and measured parameters associated with the DC2DC 106. For example, the parameters may be: components values; consumed power; input voltage; output voltage; switching frequency; and any combination thereof, or the like. Consequently, the controller 108 can adjust the switching frequency of the DC2DC 106 to achieve reduced losses based on current operational point, such as consumed current, input voltage and output voltage.

Another technical solution, provided by the present disclosure, for minimizing the losses on the receiver is modifying the input voltage to DC2DC 106 (i.e. output of the rectifier 109) by sending feedback signals to the transmitter requesting specific increase/decrease of the transmitted power (to be described in detail further below). It should be noted that, the modified input voltage selected to minimize losses, incorporates (take in consideration) the losses on the DC2DC 106 and on the resonance circuit.

In some exemplary embodiments, selecting an optimal point of operation (i.e. minimal loss) may be based on:

a. pre-calculation founded on the receiver's components values;

b. systematically performing power transfer on different operational points and measuring/determining power losses for each operational point (trial and error).

c. a combination of the above, for example determining a best operation point by calculation, and searching around that point to fine tune performance for minimal loss.

In some exemplary embodiments, the ancillary load 105 of the control and communication section of the Rx 100, may be utilized to convey messages form controller 108 to the Rx (not shown). The ancillary load 105 can be intermittently connected, in parallel to the resonance circuit, at a rate configured by controller, wherein the rate encapsulates information encoded by the controller 108. In some exemplary embodiments, the information comprises required resonance frequency, instructions, to the Tx, to increase/decrease the transmitted power, wherein the instructions may be accompanied with values, such as the amount of increase/decrease.

Figure 3:
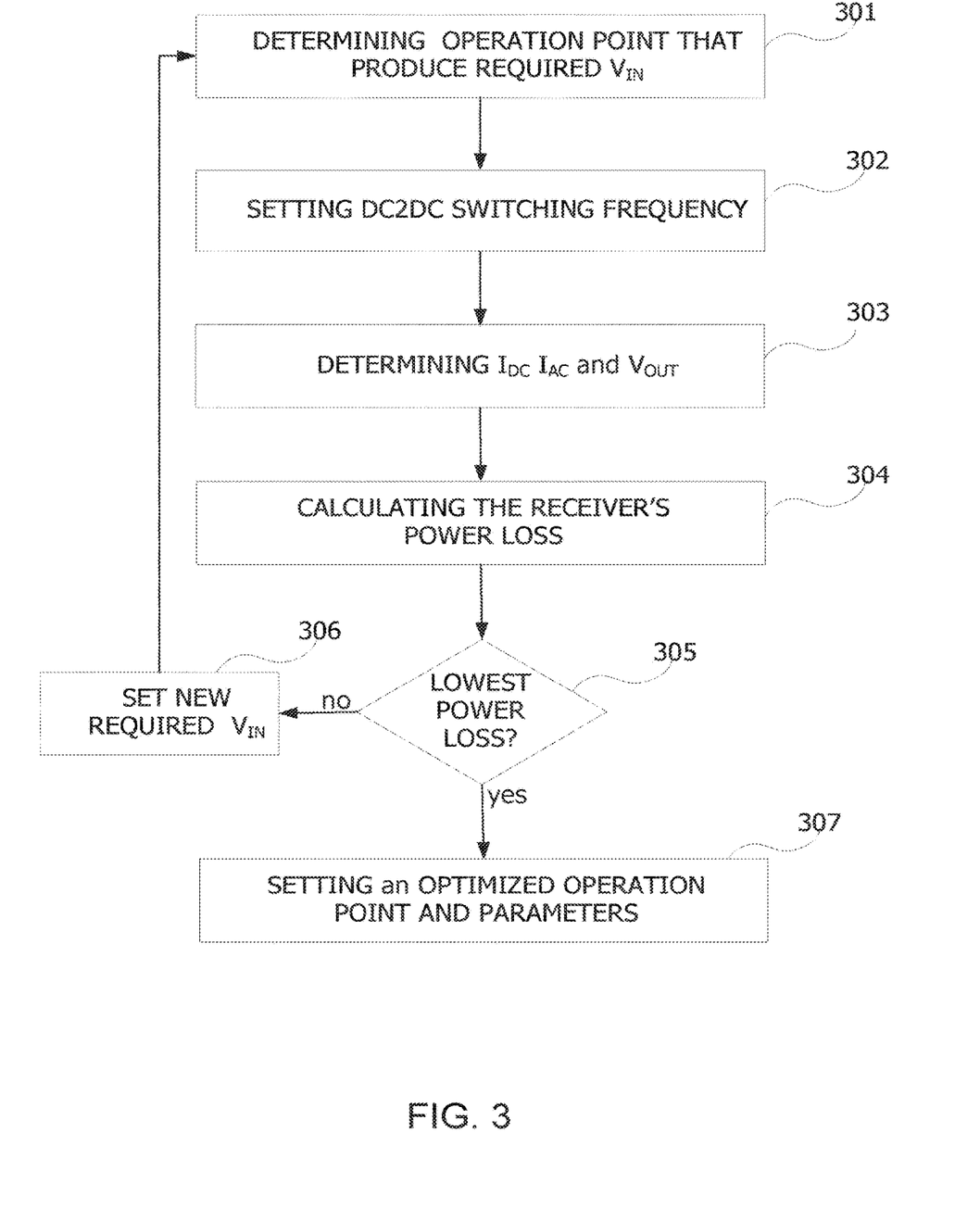
FIG. 3 shows a flowchart diagram of methods for optimizing inductive power transfer, in accordance with some exemplary embodiments of the disclosed subject matter.

In some exemplary embodiments, controller 108 may be a computerized component or a plurality of computerized components adapted to perform methods such as depicted in FIG. 3. Controller 108 may comprise a central processing unit (CPU) based on a microprocessor, an electronic circuit, an integrated circuit, implemented as special firmware ported to a specific device such as a digital signal processor, an application specific integrated circuit, and any combination thereof, or the like. In some exemplary embodiments, the controller may be utilized to perform computations required by receiver 100 or any of it subcomponents.

In some exemplary embodiments, controller 108 may also comprise an input/output (I/O) module (not shown) utilized as an interface to transmit and/or receive information and instructions between controller 108 and elements of the receiver 100, such as ancillary load 105; DC2DC 106; rectifier 109 and at least one switch 111.

In some exemplary embodiments, controller 108 may activates, through the I/O module, the ancillary load 105 with a signal that encapsulates information encoded by controller 108. The signal may be configured to excites the ancillary load 105 in a way that impact the coupling between the receiver and the Tx, so a detection circuit of the Tx can decode the information.

In some exemplary embodiments, controller 108 may sense, through the I/O module, the input AC voltage (V+, V−) applied to rectifier 109. By analyzing the amplitude and polarity of the input AC voltage, the controller can determine the T1 and T2 toggling signals. Additionally, or alternatively, controller 108 may control, through the I/O module, the charging sequence of C1 and C2 by means of controlling S1 and S2 with signals T1 and T2. It should be noted that, the actual frequency of the toggling may be in or slightly of the resonance frequency of the resonance circuit. It should also be noted that, the controller may shape the T1 and T2 toggling signals to avoid activation overlap between S1 and S2, T1 and T2 can be inverted with respect to one another.

In some exemplary embodiments, controller 108 may be configure to engage, through the I/O module, a most appropriate rectifier topology out of a plurality of rectifiers topologies (not shown) that may be available in the receiver 100. It should be noted that, a determination to engage another rectifier may be done by the controller based on the AC voltage applied on the rectifier input and other criterions associated with power loss analysis.

In some exemplary embodiments, controller 108 may sense, through the I/O module, the DC input voltage (Vin) and DC output voltage (Vout) of the DC2DC 106, the controller 108 may also sense the current (i) flowing from the DC2DC 106 to load 107. Additionally, or alternatively, the controller may regulate the output voltage of the DC2DC 106 with the switching signal.

In some exemplary embodiments, controller 108 may activate, through the I/O module, one or more switches of the at least one switch 111 in order to change the resonance frequency. By activating, with at least one switch 111, at least one capacitor (such as rcap 101) may be added in parallel to the resonance circuit, thus adding the equivalent capacitance of the at least one capacitor, which subsequently alter the resonance frequency.

In some exemplary embodiments, controller 108 may incrementally change the parallel capacitance of the resonance circuit. the controller 108 may do so by adding at least one capacitor 101 in stepwise manner, with the at least one switch 111. Consequently, each incremental change impacts the operational point of the receiver, which may be followed by measuring and or calculating, with controller, electrical parameters attributed of the new OP resulting from the resonance change. After incrementally testing a plurality of different resonance frequencies (permutation) as described above the controller may determine a preferred permutation that yield an optimal OP, i.e. minimal power loss. Additionally, or alternatively, the controller may determine an OP for internal operation considerations of the system such as voltage or current values, temperature considerations or other.

In some exemplary embodiments, the controller may also instruct the transmitter with to alter the OP as per the preferred permutation. The controller may then include in its consideration for choosing the preferred permutation based on measurements resulting from the transmitter response. Additionally, controller 108 may calculate the target value of the parallel capacitor 101, and then perform the stepwise change in relatively small steps around the calculated value.

In some exemplary embodiments, controller 108 may be configured to determine the overall imaginary impedance value (z), of receiver 100, contributed by an equivalent capacitance (Ceq) of the resonance circuit (i.e. parallel capacitance of cap 104 and the at least one rcap 101) and resistance reflected by the power supply section to the resonance circuit. The overall impedance may be extracted based upon measuring (sensing) of Vout and i. The overall imaginary impedance value (z) may be determined by the controller based on the following equation.

$$Z = imag$$

$$(\frac{1}{iwC_{eq}} \| R_{load}) = imag\left(\frac{1}{iwC_{eq} + \frac{1}{R_{load}}}\right) = -iwC_{eq} \cdot R_{load}^2 / (wC_{eq}R_{load})^2 + 1$$

It should be noted however, that the resonance frequency (w) can be determined by the controller as an [w] at which the imaginary impedance of overall inductive elements and overall capacitive elements cancel out. It should also be noted that, for a given power load on receiver 100, the reflected resistance corresponds to a squared ratio to any given Vin, thus $R_{reflected} \approx Vrect^2$.

Figure 2A:
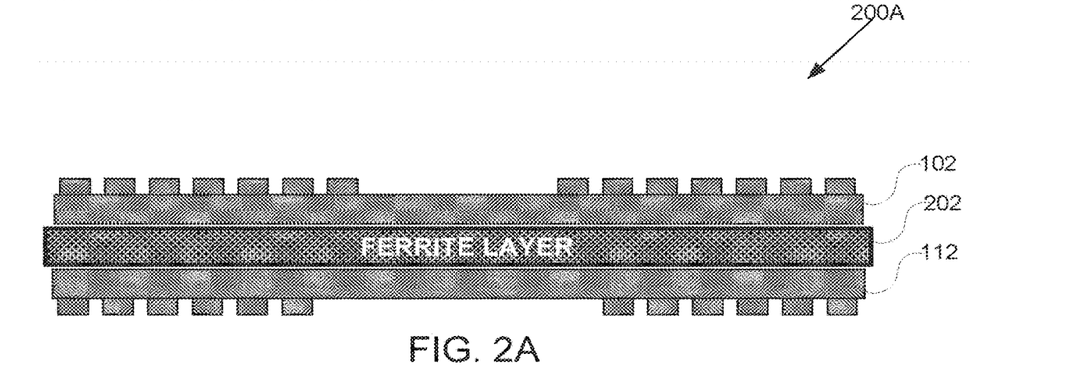
FIG. 2A shows a cross-section view of a inductors sub-assembly (sandwich) of the receiver, in accordance with some exemplary embodiments of the disclosed subject matter.
Figure 2B:
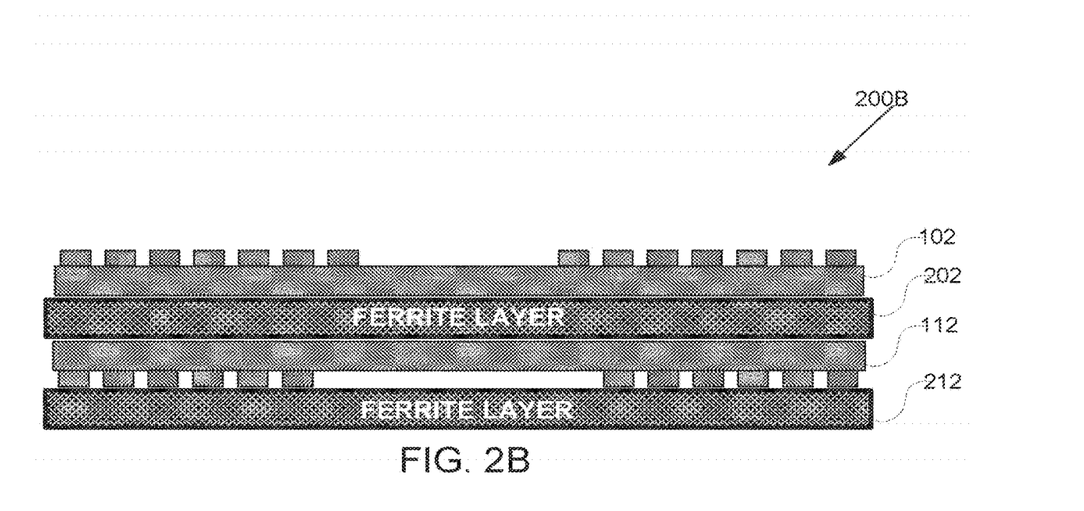
FIG. 2B shows a cross-section view of another inductors sub-assembly (sandwich) of the receiver, in accordance with some exemplary embodiments of the disclosed subject matter.

Referring now FIGS. 2A and 2B showing a cross-section views of inductors sub-assembly (sandwich) 200A and sandwich 200B of the receiver, in accordance with some exemplary embodiments of the disclosed subject matter. Sandwich 200A may be comprised of coil 102 ferrite layer 202 and inductor 112, whereas sandwich 200B is basically similar to sandwich 200A, however sandwich 200B further comprises an additional ferrite layer 212 that covers the sandwich back side.

In some exemplary embodiments, both coil 102 and inductor 112 may be printed on a flexible printed circuit (FPC) in order to minimize the thickness and cost of the coil and the inductor. Ferrite layers 202 and 212 are used to both shield emissions from the coil and the inductor as well as to increase their inductance. The ferrite layers are therefore allowing to achieve higher inductances using shorter printed wires and reduce DCR of the inductor. It should be noted that, the ferrite layers help shortening the coil and inductor length as well as reducing their thickness.

In some exemplary embodiments, coil 102; ferrite 202 and inductor 112 of sandwich 200A are embedded together as depicted in FIG. 2A and the coil 102; ferrite 202; inductor 112 and ferrite 212 of sandwich 200A are embedded together as depicted in FIG. 2B. The FPC layer of coil 102, ferrite layer 202; FPC layer of inductor 112 and ferrite layer 212, of sandwiches 200A and 200B may be affixed together by adhesive material, lamination process, bonding; and any combination thereof, or the like.

It should be noted that, that the area of a typical receiver, of a typical handheld device, may be in the range of 1000 square millimeters (mm2). Where three or more inductor/coil loops can be fitted in such printed area. The self-inductance of such loops would be typically smaller than 0.5 micro-Henry (µH). However, adding the ferrite layers as structured in the sandwiches of the present disclosure, effects the inductance by increasing it in a factor of 10, e.g. from 0.5 µH to 5 µH. These levels of inductance (range of 5 µH) may be sufficient for lowering the switching frequency of the DC2DC 106 below the 500 KHz range, in order to provide for minimal power losses. In some exemplary embodiments, the overall thickness of either sandwich 200A or 200B may be smaller than 0.3 mm It should be noted that, the dimensions of the printed wires are set to mainly optimize DCR and provide lower thickness, but also taking in to consideration the ACR of the inductor at typical operation point. During testing, the sandwich 200A and 200B it become evident that the ACR would be substantially higher then DCR for DC2DC 106 toggling frequency.

Referring now to FIG. 3 showing a flowchart diagram of a method for optimizing inductive power transfer, i.e. minimizing power loss of Rx 100, in accordance with some exemplary embodiments of the disclosed subject matter.

The method depicted in FIG. 3, described hereinafter may viewed as a "trial and error" method designed for finding out the best Rx 100 setting that yield minimum power loss in the receiver. The method is based on a plurality of cycles that constitute a scan for optimal operation point and selection of such point for lowest power losses. In some exemplary embodiments, an operation point (OP) is an energetic level at which the Tx wirelessly transmits energy to the Rx 100. The Tx can vary the transmitted energy by controlling its amplitude, duty cycle, frequency, and any combination thereof, or the like. As previously described Rx 100 is capable of instructing the Rx for increasing or decreasing its transmitted energy level.

It will be noted that, that the Rx 100 of the present disclosure may be configured to perform methods, other than the described hereinafter "trial and error" method for configuring the Rx 100 and Tx to operate at minimal power loss. In some exemplary embodiments, Rx 100 may utilize other search/scan algorithms/methods to find operational setting that yield minimal power loss, such as for example half-interval search, logarithmic search, binary chop and any combination thereof, or the like.

In step 301, an operation point that can produce required Vin may be determined. In some exemplary embodiments, a Vin (voltage applied to the DC2DC 106 by rectifier 109) may be arbitrary selected by controller 108 out of a range of predetermined desirable voltages suitable to the Rx 100 in use. Following the selection controller 108 may use ancillary load 105 to instruct the Tx to incrementally increase or decrease its output power, i.e. modifying the OP. The increase or decrease instruction initiated by the controller incorporates an incremental value, e.g. percentage of increase/decrease. Concurrently, the controller checks if the actual Vin equates to the selected Vin. In some exemplary embodiments, this process of modifying the OP may be repeated until the actual Vin and the selected Vin are equal.

In step 302, the DC2DC 106 a frequency of the switching signal may be set (established). In some exemplary embodiments, the controller 106 may adjust the frequency for producing Idc having ripple properties that are equal or smaller than a predetermined ripple requirement.

It should be noted that, the switching frequency the switching signal effects the output voltage and current of the DC2DC (Idc; Vout), whereas duty-cycle of the switching signal determine the DC2DC Vout amplitude. It should also be noted that, the higher the frequency, the lower the ripple, however power losses are proportional to the frequency. Thus, the objective of this step is to find the lowest possible frequency that meet the ripple requirements. It will be noted that, that step 302 may be optional.

In Step 303, the Idc and Iac currents as well as the Vout voltage may be determined. In some exemplary embodiments, controller 106 may vary the duty-cycle of the switching signal to adjust either the Vout or the Idc of the DC2DC to a desired setpoint. The setpoint may be dictated by load 107 characteristics. For example, type of battery load, size battery load, power supply, and any combination thereof, or the like. Following the output power (either current or voltage) adjustments of the DC2DC, for meeting the load requirements, the controller shall measure Idc, Vout values and calculate the Iac value. In some exemplary embodiments, the AC current flowing through coil 102 (Iac) may be calculated by the following equation:

$$Iac[RMS] = \frac{Vout * Idc}{Vin * \theta},$$

wherein θ is the efficiency factor of the rectifier 109 and DC2DC 106 circuits, typically in the order of 90%.

In step 304, the Rx 100 power loss may be calculated. In some exemplary embodiments, the Rx 100 power loss (RxPL) may be the sum of the magnetic circuit loss (mPL); rectifier 109 power loss (recPL) and the DC2DC 106 power loss (dc2dcPL), hence RxPL=mPL+recPL+dc2dcPL.

The magnetic circuit power loss (mPL) may be provided by the following calculation mPL=$Iac^2$*(Rac+ESR), where Rac and ESR are based on known resistance Rac parameters of coil 102 at a given magnetic field oscillation frequency and equivalent resonance capacitors ESR.

The power loss on rectifier circuit (recPL) may be provided by the following calculation recPL=$Iac^2$*(Rrec+K)*F, where Rrect represents the resistance of rectifier 109 circuit known parameters, (F) is the magnetic field oscillation frequency and (K) is a factor attributed to the rectifier topology.

The power loss on DC2DC 106 (dc2dcPL) may be determined based on Vin; Vout; Idc and known parameters, such as ACR of inductor 112; Rdc of the FETs Rdc of parasitic capacitance and any combination thereof, or the like.

In step 305, the receiver 100 power loss may be checked against a lowest possible power loss. In some exemplary embodiments, the lowest possible power loss may be the calculated power loss value of a cycle that precedes the last cycle, if the calculated power loss value of a last cycle is higher than the value of the preceding cycle. Thereby, the calculated power loss value of the preceding cycle may represent the optimal power loss value of the Rx 100. It should be noted that, in the present disclosure a cycle starts at step 301 and ends at step 305, therefore, the last cycle of such exemplary embodiments, may be defined as the final cycle of the scan.

Additionally, or alternatively, the final cycle may be the last cycle after cycling for all Vin(s) in the range and finding an OP for all the Vin(s) in the range. In such exemplary embodiments, the cycle that yield the best calculated power loss value out of all cycles of the scan may be the optimal power loss value for the Rx 100. It should be noted that, a typical range may be 4 to 12 volts with increments of approximately 0.2 volts for each Vin. However, it will be noted that, the present disclosure is not limited to the typical range and increments listed above.

In step 306, a new Vin may be set prior to repeating step 301. In some exemplary embodiments, where the current cycle is not the final cycle, an incremental value may be either added or subtracted to/from the Vin value of the previous cycle and a new cycle may began.

In Step 307, an optimized operation point (OP) and parameters may be set. In some exemplary embodiments, the parameters and the OP that yield the optimal (minimum) power loss value may be set as a default configuration of the Rx 100 and its associated transmitter. In some exemplary embodiments, the parameters may comprise an optimal OP for the transmitter as well as parameters such as (but not limited to), Vin, Vout and Idc for the receiver.

In some exemplary embodiments of the disclosed subject matter, a second method, which is a variation of the method depicted in FIG. 3, can be used. In the 2nd method the selection of the best operational point (OP) is performed solely based on target Vout; Idc known receiver circuit parameters, and any combination thereof, or the like. The 2nd method may be identical to the method (depicted in FIG. 3 above) with the exception of the first and last steps.

In some exemplary embodiments of the 2nd method, the process of determining the OP for a target Vin (i.e. step 301) may be replaced by defining/calculating, with controller 108, a most appropriate OP for the target Vin.

In some exemplary embodiments of the 2nd method, setting an optimized operation point (i.e. step 307) may further comprise resetting the Tx to an OP that yield the minimum recPL as well as adjusting the switching signal of the DC2DC 106 for: a calculated Vout and Idc that produced minimum recPL.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A receiver inductively powered by a transmitter, the receiver comprising:
   a resonance circuit configured to couple with the transmitter and generate an alternating current (AC) voltage;
   a power supply section configured to rectify the AC voltage and adjust a direct current (DC) voltage and a DC current to power a load; and
   a control and communication section configured to set parameters for the receiver and communicate operation points (OP) to the transmitter,
   wherein the parameters and the OP are derived from calculating power losses for different input voltages to the receiver and determining a minimal power loss of the receiver from the power losses.

2. The receiver of claim 1, wherein the power supply section comprises a rectifier comprises one or more holding capacitors and one or more field-effect transistor (FET) switches, wherein each FET switch is separately gated for charging the one or more holding capacitors.

3. The receiver of claim 2, wherein a gate of a first FET of the one or more FET switches is open during a half of a AC cycle for charging a first holding capacitor of the one or more holding capacitors.

4. The receiver of claim 3, wherein a gate of the second FET of the one or more FET switches is open during another half of the AC cycle for charging a second holding capacitor of the one or more holding capacitors.

5. The receiver of claim 4, wherein the first and second holding capacitors are connected to produce an output voltage that is twice an absolute value of one half.

6. The receiver of claim 1, wherein the power supply section comprises a DC-to-DC convertor (DC2DC).

7. The receiver of claim 1, wherein the resonance circuit comprises a coil and a serial capacitor.

8. The receiver of claim 1, wherein the resonance circuit comprises a coil and one or more of an equivalent capacitor, a parallel capacitor, and at least resonance capacitor.

9. The receiver of claim 1, wherein the resonance circuit comprises one or more switchable branches of at least one resonance capacitor.

10. The receiver of claim 9, wherein the control and communication section is configured to activate one of the one or more switchable branches for tuning resonance frequency of the resonance circuit.

11. A method for minimizing power loss of a receiver inductively powered by a transmitter, the receiver powering a load, the method comprising:
   determining an operation point of the transmitter that produces a required input voltage to a DC-to-DC convertor (DC2DC);
   establishing switching frequency to yield a predetermined ripple requirement;
   determining a required output power of the receiver and a needed alternating current (AC) current for obtaining an output current;
   calculating power losses for different input voltages to the receiver;
   determining a minimal power loss from the power losses; and
   configuring parameters of the receiver and operation points (OP) of the transmitter to yield the minimal power loss.

12. The method of claim 11, wherein a control and communication section of the receiver sets the parameters for the receiver and communicates the OP to the transmitter.

13. The method of claim 11, wherein a power supply section of the receiver comprises a rectifier comprises one or more holding capacitors and one or more field-effect transistor (FET) switches, wherein each FET switch is separately gated for charging the one or more holding capacitors.

14. The method of claim 13, wherein a gate of a first FET of the one or more FET switches is open during a half of a AC cycle for charging a first holding capacitor of the one or more holding capacitors.

15. The method of claim 14, wherein a gate of the second FET of the one or more FET switches is open during another half of the AC cycle for charging a second holding capacitor of the one or more holding capacitors.

16. The method of claim 15, wherein the first and second holding capacitors are connected to produce an output voltage that is twice an absolute value of one half.

17. The method of claim 11, wherein the resonance circuit comprises a coil and a serial capacitor.

18. The method of claim 11, wherein the resonance circuit comprises a coil and one or more of an equivalent capacitor, a parallel capacitor, and at least resonance capacitor.

19. The method of claim 11, wherein the resonance circuit comprises one or more switchable branches of at least one resonance capacitor.

20. The method of claim 19, wherein the control and communication section is configured to activate one of the one or more switchable branches for tuning resonance frequency of the resonance circuit.

\* \* \* \* \*

UNITED STATES PATENT AND TRADEMARK OFFICE
CERTIFICATE OF CORRECTION

| | |
|---|---|
| PATENT NO. | : 11,462,947 B2 |
| APPLICATION NO. | : 17/520256 |
| DATED | : October 4, 2022 |
| INVENTOR(S) | : Itay Sherman et al. |

It is certified that error appears in the above-identified patent and that said Letters Patent is hereby corrected as shown below:

On the Title Page

In Item (72), under "Inventors", in Column 1, Line 3, delete "Nes Ziona" and insert -- Ness Ziona --, therefor.

On Page 2, in Item (56), under "OTHER PUBLICATIONS", in Column 2, Line 2, delete "PCTI/L2018/051080," and insert -- PCT/IL2018/051080, --, therefor.

In the Specification

In Column 1, Line 9, delete "2020," and insert -- 2020, now Pat. No. 11,190,052, --, therefor.

In Column 1, Line 20, delete "loos" and insert -- loss --, therefor.

In Column 1, Line 40, delete "of" and insert -- in --, therefor.

In Column 3, Line 7, delete "a" and insert -- an --, therefor.

In Column 4, Line 17, delete "like" and insert -- like. --, therefor.

In Column 4, Line 26, delete "done" and insert -- done by --, therefor.

In Column 4, Line 29, delete "and or" and insert -- and/or --, therefor.

In Column 4, Line 42, delete "were" and insert -- where --, therefor.

In Column 5, Line 47, delete "compare" and insert -- compared --, therefor.

Signed and Sealed this
Seventh Day of March, 2023

Katherine Kelly Vidal
*Director of the United States Patent and Trademark Office*

In Column 5, Line 50, delete "the" and insert -- and the --, therefor.

In Column 5, Line 62, delete "DC2DC 108," and insert -- DC2DC 106, --, therefor.

In Column 5, Line 65, delete "DC2DC 108" and insert -- DC2DC 106 --, therefor.

In Column 6, Line 3, delete "DC2DC 108" and insert -- DC2DC 106 --, therefor.

In Column 6, Line 66, delete "form" and insert -- from --, therefor.

In Column 7, Line 19, delete "receiver 100 or any of it" and insert -- receiver 100 or any of its --, therefor.

In Column 7, Line 48, delete "configure" and insert -- configured --, therefor.

In Column 8, Line 5, delete "the" and insert -- The --, therefor.

In Column 8, Line 9, delete "and or" and insert -- and/or --, therefor.

In Column 8, Line 10, delete "of" and insert -- to --, therefor.

In Column 8, Line 20, delete "with to" and insert -- to --, therefor.

In Column 8, Line 29, delete "receiver 100," and insert -- the receiver 100, --, therefor.

In Column 8, Line 49, delete "receiver 100," and insert -- the receiver 100, --, therefor.

In Column 9, Line 4, delete "ferrite 202" and insert -- ferrite layer 202 --, therefor.

In Column 9, Line 6, delete "ferrite 202;" and insert -- the ferrite layer 202; --, therefor.

In Column 9, Line 7, delete "ferrite 212" and insert -- the ferrite layer 212 --, therefor.

In Column 9, Line 29, delete "in to" and insert -- into --, therefor.

In Column 9, Line 37, delete "may" and insert -- may be --, therefor.

In Column 9, Line 62, delete "arbitrary" and insert -- arbitrarily --, therefor.

In Column 10, Line 8, delete "controller 106" and insert -- controller 108 --, therefor.

In Column 10, Line 11, delete "the" and insert -- of the --, therefor.

In Column 10, Line 23, delete "controller 106" and insert -- controller 108 --, therefor.

In Column 10, Line 43, delete "magnetic circuit loss (mPL);" and insert -- magnetic circuit power loss (mPL); --, therefor.

In Column 10, Line 62, delete "receiver 100" and insert -- Rx 100 --, therefor.